(12) United States Patent
Ridgway

(10) Patent No.: US 8,459,656 B2
(45) Date of Patent: Jun. 11, 2013

(54) FUEL LINE GASKET FOR USE WITH A DIESEL FUEL INJECTOR

(76) Inventor: Robert K Ridgway, Northbrook, IL (US)

(*) Notice: Subject to any disclaimer, the term of this patent is extended or adjusted under 35 U.S.C. 154(b) by 76 days.

(21) Appl. No.: 12/582,065

(22) Filed: Oct. 20, 2009

(65) Prior Publication Data

US 2011/0089643 A1   Apr. 21, 2011

(51) Int. Cl.
*F02F 11/00*   (2006.01)

(52) U.S. Cl.
USPC .......................................................... 277/590

(58) Field of Classification Search
USPC ................. 277/590–595, 598, 608, 609, 612, 277/616, 626, 627
See application file for complete search history.

(56) References Cited

U.S. PATENT DOCUMENTS

| | | | | |
|---|---|---|---|---|
| 1,851,948 A * | 3/1932 | Summers | | 277/606 |
| 4,869,516 A * | 9/1989 | Udagawa et al. | | 277/595 |
| 5,096,209 A * | 3/1992 | Ross | | 277/342 |
| 5,169,182 A * | 12/1992 | Hashimoto | | 285/332.2 |
| 5,750,283 A * | 5/1998 | DePalma et al. | | 429/56 |
| 6,471,217 B1 * | 10/2002 | Hayfield et al. | | 277/602 |
| 6,634,649 B1 * | 10/2003 | Yamaguchi et al. | | 277/634 |
| 7,637,509 B2 * | 12/2009 | Dußler et al. | | 277/637 |

* cited by examiner

*Primary Examiner* — Thomas Beach
*Assistant Examiner* — Gilbert Lee
(74) *Attorney, Agent, or Firm* — Schmid PA

(57) ABSTRACT

Disclosed is a gasket for sealing a fuel connection for a diesel fuel injector. The gasket resides between the filter caps and the jumper block. The gasket includes a pair of holes having frustoconical shaped sidewalls designed to fit within the chamfer walls of the filter caps. The gasket further includes an aperture designed to fit over the threaded injector stud.

14 Claims, 3 Drawing Sheets

FUEL LINE GASKET FOR USE WITH A DIESEL FUEL INJECTOR

TECHNICAL FIELD

The present invention relates to gaskets and in particular to gaskets for sealing a fuel connection for a diesel fuel injector.

BACKGROUND

Diesel fuel injectors are subject to heavy and repeated use and must be designed for large variations in temperature and by necessity operate under high pressure, as well as continuous vibration. One major problem with the fuel injectors is fuel and oil leaks at the connection of the fuel jumper line to the engine's fuel manifold.

In prior designs, leaks were prevalent due to the engine vibration which caused the parts sealing the fuel jumper line, particularly at the washer, to deteriorate, lose torque and to leak, where the fuel line is mounted to the exterior portion of the fuel manifold. Another point of contact where leakage occurred is where the fuel jumper block attaches to the fuel line manifold. In conventional designs, all of the components at the fuel line jumper block to engine manifold are connected essentially by one bolt, which when loosened, causes leakage.

Leaks typically occur where the ends of the fuel jumper line are affixed to the fuel manifold on the one end and the injector body on the opposite end. Leaks occur where the bolt secures the fuel line manifold to the fuel line jumper block and where the fuel line fitting is affixed to the fuel line manifold. Finally, leaks also occur where the filter cap of the fuel jumper line is affixed to the injector body.

Thus what is need is an apparatus designed to provide substantially improved sealing to prevent leakage.

SUMMARY

The present invention provides a gasket for sealing a fuel connection for a diesel fuel injector. The gasket resides between the filter caps and the jumper block. The gasket includes a pair of holes having frustoconical shaped sidewalls designed to fit within the chamfer walls of the filter caps. The gasket further includes an aperture designed to fit over the threaded injector stud.

In greater detail the present invention includes a fuel line gasket for use with a diesel fuel injector. The fuel injector includes a threaded injector stud for securing a jumper block. The injector further includes a pair of filter caps on either side of the injector stud having female chamfer walls for receiving the chamfered portions of fuel jumper lines delivering fuel to the injector.

The gasket includes a body having first and second opposed interface surfaces and a hole or aperture positioned within the interface surfaces for receiving the injector stud. The gasket further includes a pair of holes positioned within the interface surfaces having chamfer walls. The pair of holes are positioned such that the chamfered walls of the pair of holes fit within the chamfer walls of the filter caps of the injector. The gasket forms a fluid seal when the body is compressed between the jumper block and filter caps.

The gasket can be made as a unitary piece. The gasket may further be molded and formed from a polymeric material such as flouroelastomer. Typically the body matingly engages with a substantial portion of the female chamfer walls of the filter caps.

DRAWINGS

In the Drawings

DETAILED DESCRIPTION

Disclosed is a gasket for sealing a fuel connection for a diesel fuel injector. The gasket resides between the filter caps and the jumper block. The gasket includes a pair of holes having frustoconical shaped sidewalls designed to fit within the chamfer walls of the filter caps. The gasket further includes an aperture or hole designed to fit over the threaded injector stud.

Figure 1:
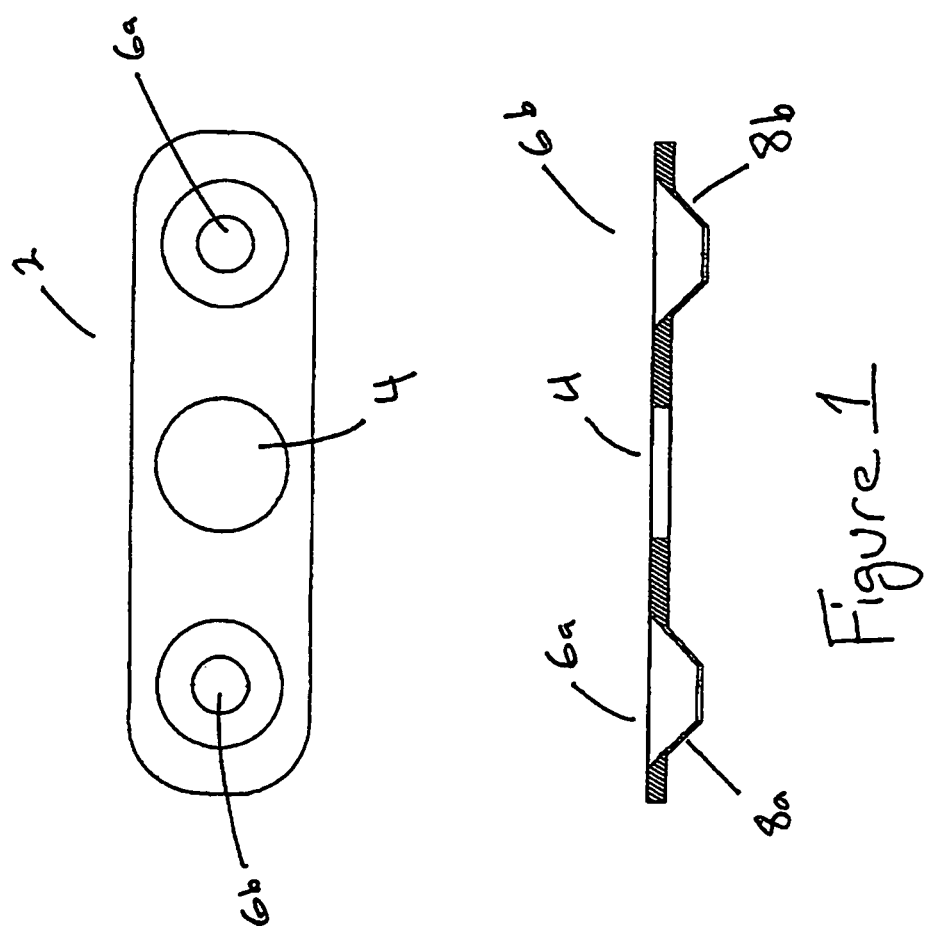
FIG. 1 illustrates an embodiment of the present apparatus showing both a side view of the gasket and a top view of the gasket showing the apertures and including the frustoconical shaped sidewalls of the pair of holes.
Figure 2:
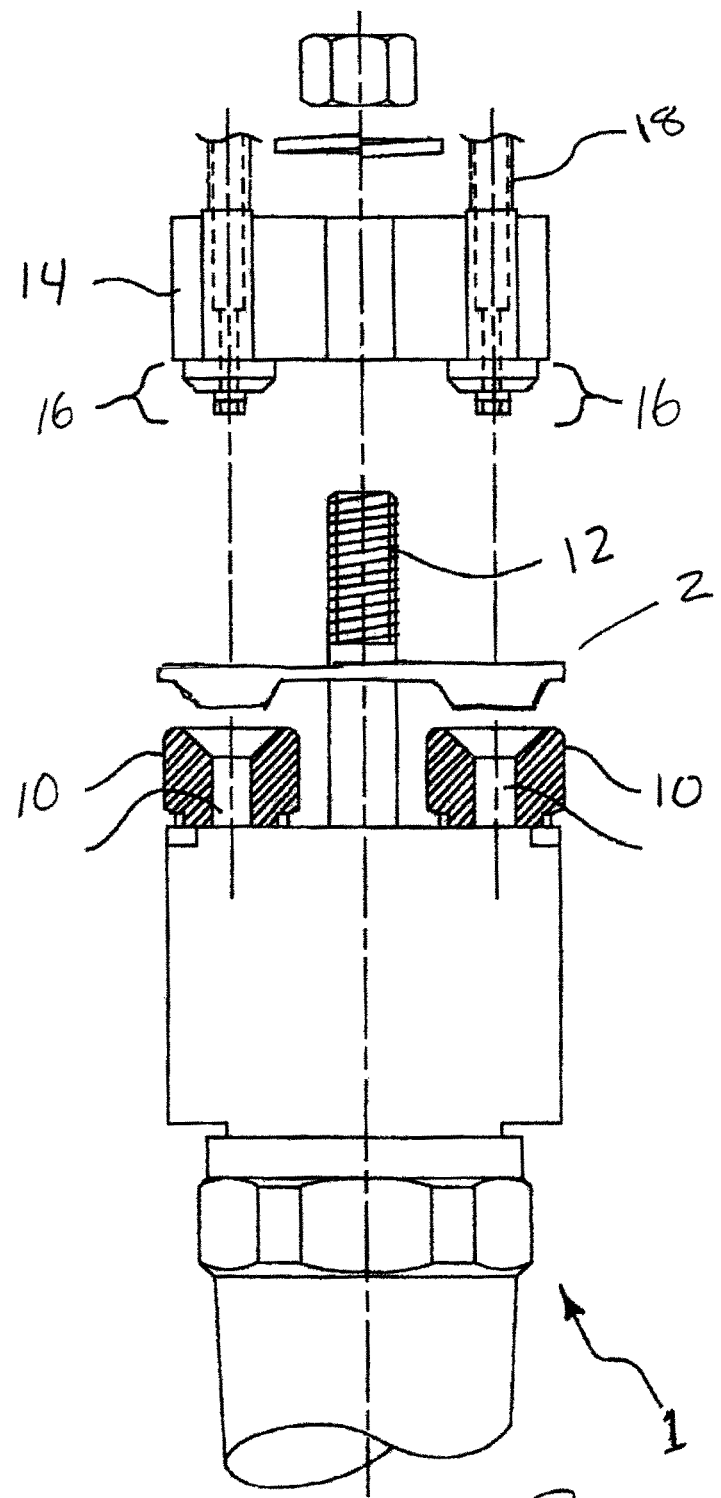
FIG. 2 depicts the gasket in relationship to the fuel injector including the threaded stud of the injector and the filter caps.
Figure 3:
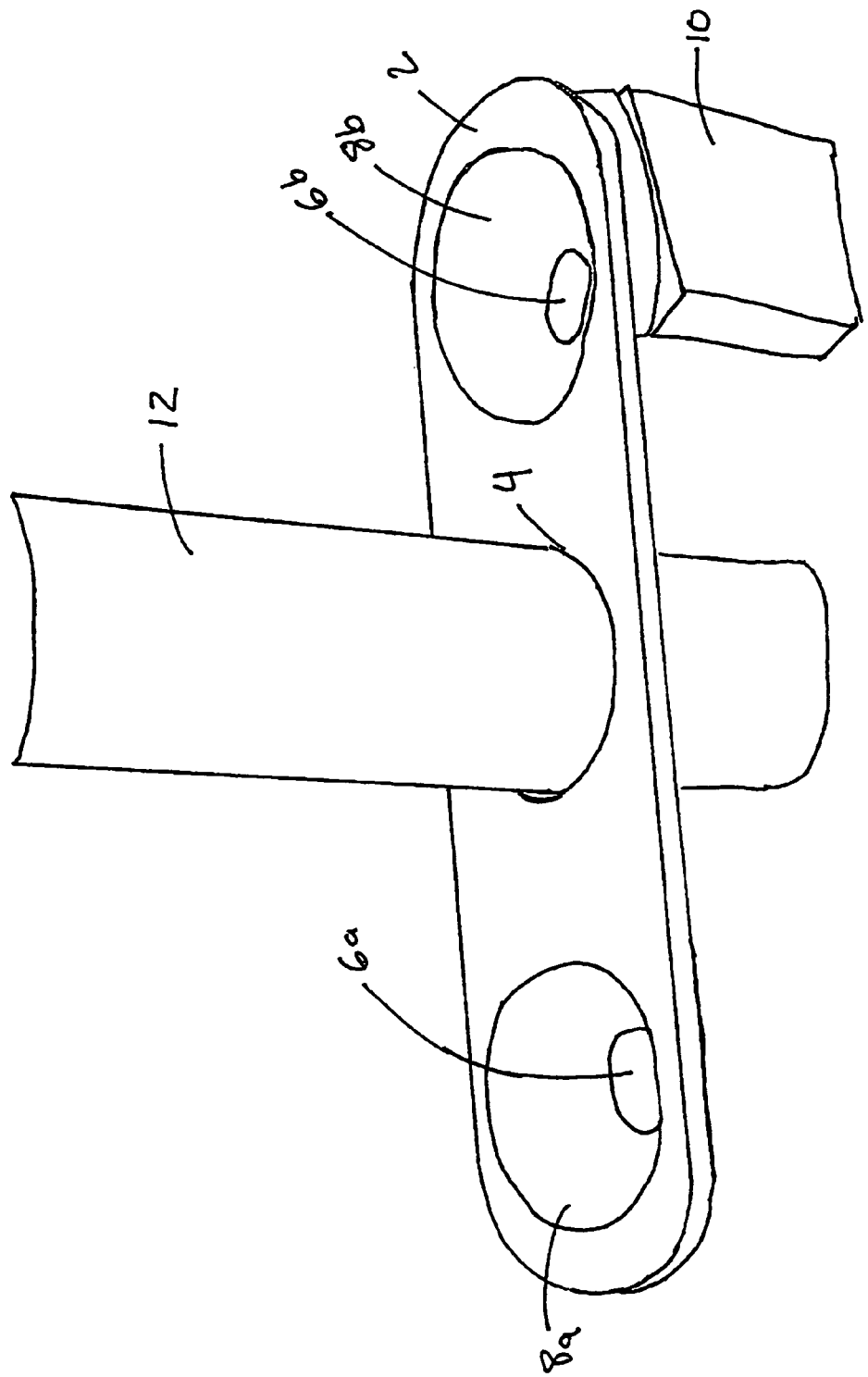
FIG. 3 is a further depiction of the gasket in cooperation with the fuel injector residing on the filter caps and over the threaded stud.

Referring now in greater detail to the drawings in which like numerals indicate like items throughout the several views, FIGS. 1-3 depict the fuel line gasket for use with a diesel fuel injector.

FIG. 1 depicts embodiments of the present gasket 2. The gasket 2 includes a body having first and second opposed interface surfaces and a hole or aperture 4 positioned within the interface surfaces for receiving the injector stud 12. The gasket 2 further includes a pair of holes 6 (*a-b*) positioned within the interface surfaces having chamfer walls 8(*a-b*). The pair of holes 6(*a-b*) are positioned such that the chamfered walls 8(*a-b*) of the pair of holes fit within the chamfer walls of the filter caps 10 of the injector 1. The gasket 2 forms a fluid seal when the body is compressed between the jumper block 14 and filter caps 10.

Referring to FIG. 2, there is shown the connection between the injector body and the fuel jumper lines, the threaded injector stud 12 is inserted through the opening of fuel line jumper block 14. The injector stud 12 is fastened with a lock washer and preferably, a hexagonal nut, although a number of different types of nuts, e.g. allen nuts or square nuts, will also suffice.

With continued reference to FIG. 2, the fuel jumper lines 3 and 5 are inserted into the filter caps 10. The filter caps 10 are formed with female chamfer walls at the upper portion of cylindrical walls to receive the conical fittings. A positive seal is created with the sidewalls 8(*a-b*) of the pair of holes 6(*a-b*) which are frustoconical shaped when they are compressed between the chamfer walls of jumper lines 16 and the chamfer walls of the filter caps 10. The fuel is delivered from the injector 1 through the fuel jumper lines 18, their respective fittings into the fuel injector 1 for delivery to the combustion chamber.

FIG. 3 is a further depiction of the gasket 2 in cooperation with the fuel injector 1 residing on the filter caps 10 and over the threaded stud 12. FIG. 3 illustrates the chamfered walls 8(*a-b*) of the pair of holes 6(*a-b*) fitting within the filter caps 10. Further shown is the gasket 2 fitted over the threaded stud 12 through the central hole 4.

While Applicant has set forth embodiments as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A fuel line gasket for use with a diesel fuel injector including a threaded injector stud for securing a jumper block and a pair of filter caps on either side of the injector stud having female chamfer walls for receiving the chamfered portions of fuel jumper lines delivering fuel to the injector comprising:

a body having first and second opposed interface surfaces and a hole positioned within the interface surfaces for receiving the injector stud, a pair of holes positioned within the interface surfaces having an opening for receiving the chamfered portions of fuel jumper lines delivering fuel to the injector and the pair of holes having frustoconical shaped chamfer walls and, wherein the walls of the pair of holes positioned such that the chamfered walls of the pair of holes extend into the chamfer walls of the filter caps of the injector and form a fluid seal when the body is compressed between the jumper block and filter caps.

2. The fuel line gasket of claim 1, wherein the body is a unitary piece.

3. The fuel line gasket of claim 1, wherein the body is molded.

4. The fuel line gasket of claim 1, wherein the body is formed by a polymeric material.

5. The fuel line gasket of claim 4, wherein the polymeric material forming the body is a fluoroelastomer.

6. The fuel line gasket of claim 1, wherein the holes are substantially circular.

7. The fuel line gasket of claim 1, wherein said body matingly engages with a substantial portion of the female chamfer walls of the filter caps.

8. The fuel line gasket of claim 1, wherein the chamfered walls of the pair of holes have a thickness less than portion of the body being substantially parallel to the block.

9. A fuel line gasket for use with a diesel fuel injector including a threaded injector stud for securing a jumper block and a pair of filter caps on either side of the injector stud having female chamfer walls for receiving the chamfered portions of fuel jumper lines delivering fuel to the injector comprising:

a body formed from a polymeric material and having first and second opposed interface surfaces and a hole positioned within the interface surfaces for receiving the injector stud, a pair of holes positioned within the interface surfaces having an opening for receiving the chamfered portions of fuel jumper lines delivering fuel to the injector and the pair of holes having chamfer walls being frustoconical shaped and sized and positioned on the body to fit within the chamfer walls of the filter caps of the injector for forming a fluid seal when the body is compressed between the jumper block and filter caps.

10. The fuel line gasket of claim 9, wherein the body is a unitary piece.

11. The fuel line gasket of claim 9, wherein the body is molded.

12. The fuel line gasket of claim 9, wherein the polymeric material forming the body is a fluoroelastomer.

13. The fuel line gasket of claim 9, wherein the chamfered walls of the pair of holes have a thickness less than portion of the body being substantially parallel to the block.

14. A fuel line gasket for use with a diesel fuel injector including a threaded injector stud for securing a jumper block and a pair of filter caps on either side of the injector stud having female chamfer walls for receiving the chamfered portions of fuel jumper lines delivering fuel to the injector comprising:

a body formed from a fluoroelastomer and having first and second opposed interface surfaces and a hole positioned within the interface surfaces for receiving the injector stud, a pair of holes at positioned within the interface surfaces having an opening for receiving the chamfered portions of fuel jumper lines delivering fuel to the injector and the pair of holes having chamfer walls being frustoconical shaped and sized and positioned on the body to fit within the chamfer walls of the filter caps of the injector for forming a fluid seal when the body is compressed between the jumper block and filter caps.

* * * * *